US006805112B2

(12) United States Patent
Cole et al.

(10) Patent No.: US 6,805,112 B2
(45) Date of Patent: Oct. 19, 2004

(54) CONVECTION OVEN HAVING MULTIPLE AIRFLOW PATTERNS

(76) Inventors: James T. Cole, 1940 Aspen Dr., Algonquin, IL (US) 60102; Donald E. Fritzsche, 431 Winston La., Chicago Heights, IL (US) 60411; David W. Harter, 12609 Lacey Dr., New Port Richey, FL (US) 34654; Ronald Jay Forni, 4 Cricket La., Littleton, MA (US) 01460; Malcolm Reay, 57 Pamela Dr., Drums, PA (US) 18222; Jerry Sank, 1801 Maplewood Ct., Palm Harbor, FL (US) 34684; David McFadden, 9 Pine Knoll Rd., Lexington, MA (US) 02173; Douglas S. Jones, 8080 Sycamore Dr., New Port Richey, FL (US) 34654

( * ) Notice: Subject to any disclaimer, the term of this patent is extended or adjusted under 35 U.S.C. 154(b) by 220 days.

(21) Appl. No.: 09/893,327

(22) Filed: Jun. 27, 2001

(65) Prior Publication Data

US 2003/0000515 A1 Jan. 2, 2003

(51) Int. Cl.[7] .............................. A21B 1/24; A21B 1/28; A21B 1/33
(52) U.S. Cl. .................................. 126/21 A; 126/21 R
(58) Field of Search .............................. 126/21 A, 21 R, 126/19 R; 432/19, 21, 48, 152, 159, 191; 34/222, 229, 131; 99/468, 473, 474–476, 480, 481; 219/400

(56) References Cited

U.S. PATENT DOCUMENTS

| | | | | |
|---|---|---|---|---|
| 1,499,627 A | * | 7/1924 | Thelen ........................... 34/90 |
| 1,729,675 A | * | 10/1929 | Lecocq ......................... 34/223 |
| 1,964,115 A | * | 6/1934 | Goodall ........................ 34/221 |
| 2,002,170 A | * | 5/1935 | Barozzi ........................ 34/191 |
| 2,006,018 A | * | 6/1935 | Goodall ........................ 34/191 |
| 2,214,630 A | * | 9/1940 | Wheeler ....................... 219/400 |
| 2,270,111 A | * | 1/1942 | Daley ............................ 34/543 |
| 2,617,203 A | * | 11/1952 | Murray ........................... 34/82 |
| 3,149,932 A | * | 9/1964 | Bachrich ...................... 34/191 |
| 3,272,156 A | * | 9/1966 | Gilgore ......................... 432/89 |
| 3,324,844 A | * | 6/1967 | Huffman ................... 126/21 A |
| 3,659,352 A | * | 5/1972 | Cook ........................... 34/191 |
| RE28,226 E | * | 11/1974 | Cook ........................... 34/191 |
| 4,029,463 A | * | 6/1977 | Johansson et al. ............. 432/25 |
| 4,308,853 A | * | 1/1982 | Thirode .................... 126/21 A |
| 4,357,762 A | * | 11/1982 | Eustacchio .................... 34/229 |
| 4,467,777 A | * | 8/1984 | Weber ....................... 126/21 A |
| 4,648,377 A | * | 3/1987 | Van Camp ................ 126/21 A |
| 4,779,604 A | | 10/1988 | König |
| 4,862,599 A | * | 9/1989 | Brunner ......................... 34/46 |
| 5,146,910 A | * | 9/1992 | Grahl et al. ............. 126/110 R |
| 5,385,137 A | * | 1/1995 | Christensen et al. ...... 126/21 R |
| 5,569,402 A | * | 10/1996 | Meisser et al. .............. 219/400 |
| 5,636,622 A | * | 6/1997 | Urcelay Amondarain et al. ........................... 126/20 |
| 5,676,870 A | * | 10/1997 | Wassman et al. ........... 219/400 |
| 5,680,712 A | * | 10/1997 | Kiyokawa et al. ............. 34/267 |
| 6,517,882 B2 | * | 2/2003 | Elia et al. .................... 426/523 |

FOREIGN PATENT DOCUMENTS

| | | | |
|---|---|---|---|
| GB | 2215177 | * | 9/1989 |
| JP | 2000-329351 | * | 11/2000 |

* cited by examiner

*Primary Examiner*—Carl D. Price
(74) *Attorney, Agent, or Firm*—Mark E. Fejer

(57) ABSTRACT

A convection oven having multiple airflow patterns within a cooking chamber during a baking cycle. In one embodiment, at least one reversible blower wheel rotatable at varying speeds produces separate airflow states to create multiple airflow patterns within the cooking chamber during a baking cycle. In another preferred embodiment, at least one adjustable airflow control surface mounted within the cooking chamber creates multiple airflow patterns within the cooking chamber during the baking cycle.

7 Claims, 3 Drawing Sheets

CONVECTION OVEN HAVING MULTIPLE AIRFLOW PATTERNS

BACKGROUND OF THE INVENTION

Field of the Invention

This invention relates to a convection oven having multiple airflow patterns within a cooking chamber during the baking cycle. The convection oven has at least one blower wheel rotatable at different speeds and/or in different directions for creating multiple airflow patterns within the cooking chamber during a baking cycle. Alternatively, at least one mechanically actuated adjustable airflow control surface creates multiple airflow patterns within the cooking chamber during a baking cycle.

Description of Related Art

Conventional commercial convection ovens have one or more fans which circulate air within an oven cavity. The airflow within the oven cavity is highly turbulent but characterized by a circulation pattern evident in the oven's cooking performance. A distinct and often undesirable pattern is seen on the cooked food product. In areas of the oven cavity where the airflow is too low, the food product will be raw or uncooked. Conversely, in areas where the airflow is too high, the food product will be burned or overcooked. In such situations, it is desirable to tune the convection oven so that a uniform airflow is obtained.

Many conventional commercial convection ovens are tuned by attempting to produce a single flow pattern having a uniform flow and temperature distribution within the oven cavity. However, accurately tuning conventional convection ovens is difficult, and often a trial and error process.

It is apparent that there is a need for an easy and effective method for tuning the baking performance of a convection oven wherein multiple airflow patterns are created within the cooking chamber during a baking cycle.

SUMMARY OF THE INVENTION

It is an object of this invention to provide a convection oven having an easy and effective method for providing multiple airflow patterns within the cooking chamber during the baking cycle.

It is another object of this invention to provide a convection oven having at least one blower wheel rotatable at different speeds and/or in different directions for creating multiple airflow patterns within the cooking chamber during a baking cycle.

It is another object of this invention to provide a convection oven having at least one adjustable airflow control surface for creating multiple airflow patterns within the cooking chamber during a baking cycle.

The above objects and other objects of this invention are accomplished by a convection oven having a cooking chamber with dimensions to accommodate any type, quantity and/or size of food product. An outer enclosure is in communication with the cooking chamber. In one preferred embodiment, at least one reversible blower wheel, preferably at least two reversible blower wheels, are mounted within the outer enclosure.

The reversible blower wheels rotate in the same direction with respect to each other or in different or opposite directions with respect to each other, producing at least four separate airflow states to create different airflow patterns within the cooking chamber. Additional airflow patterns are created by varying the speed at which the reversible blower wheels rotate with respect to each other.

In another preferred embodiment of this invention, at least one adjustable airflow control surface is mounted within the cooking chamber. The adjustable airflow control surface has, for example a baffle or a fin which is adjustable between a plurality of positions to change the geometry of the cooking chamber. An actuator adjusts the adjustable airflow control surface between a plurality of positions during the baking cycle. As a result, additional airflow states are produced which create multiple airflow patterns within the cooking chamber. The airflow states can be switched in a predetermined cycle or a random cycle. A uniform baking performance is obtained by averaging the multiple airflow patterns created by periodically switching between the airflow states during the baking cycle. The baking performance of the average state is better than the baking performance of any individual airflow state.

In one preferred embodiment of this invention, a removable inlet baffle is positioned between the cooking chamber and the outer enclosure. Preferably, the inlet baffle has an air return in communication with each reversible blower wheel to allow communication between the cooking chamber and the outer enclosure. The inlet baffle may have a plurality of apertures to allow communication between the cooking chamber and the outer enclosure.

The convection oven has a gas combustion system mounted with respect to the outer enclosure which produces or generates combustion products. The combustion products generated by the gas combustion system move into a heat exchange element. The heat exchange element is mounted within the outer enclosure and with respect to the reversible blower wheels.

In one preferred embodiment according to this invention, separate airflow states are produced by varying the speeds at which the reversible blower wheels rotate with respect to each other and/or changing the direction in which the reversible blower wheels rotate. By varying the respective speed and/or rotational direction of the reversible blower wheels to produce separate airflow states, multiple airflow patterns are created within the cooking chamber. These airflow patterns can be switched or changed periodically during the baking cycle to improve the baking performance of the convection oven.

In another preferred embodiment according to this invention, the adjustable airflow control surface produces multiple airflow patterns within the cooking chamber by adjusting the adjustable airflow control surface with an actuator to produce different airflow states. Multiple airflow patterns are created during the baking cycle of the convection oven by adjusting the adjustable airflow control surface, improving the baking performance of the convection oven.

DETAILED DESCRIPTION OF THE PREFERRED EMBODIMENTS

Figure 1:
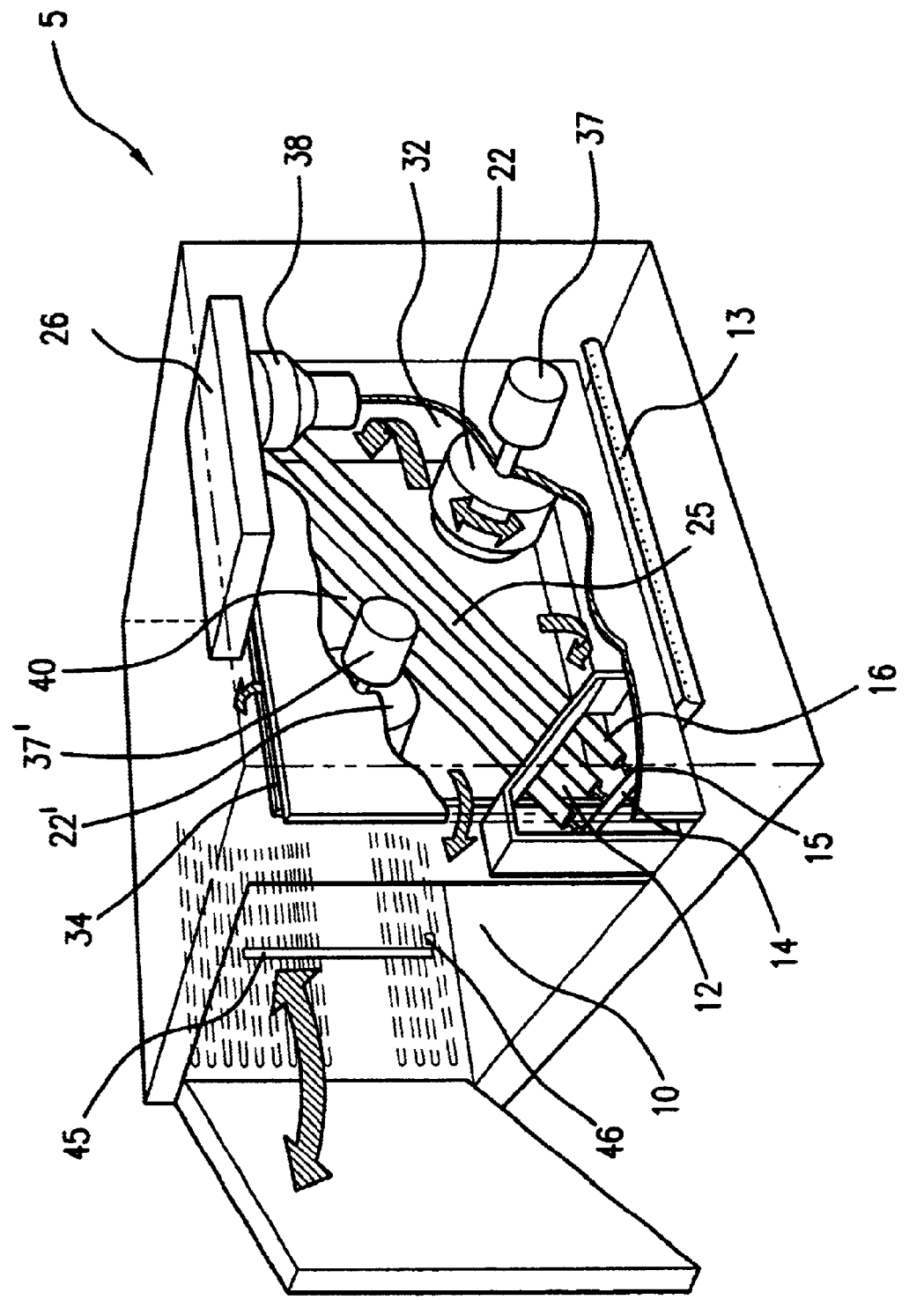
FIG. 1 is a perspective view of a convection oven having two blower wheels, according to one preferred embodiment of this invention.
Figure 2:
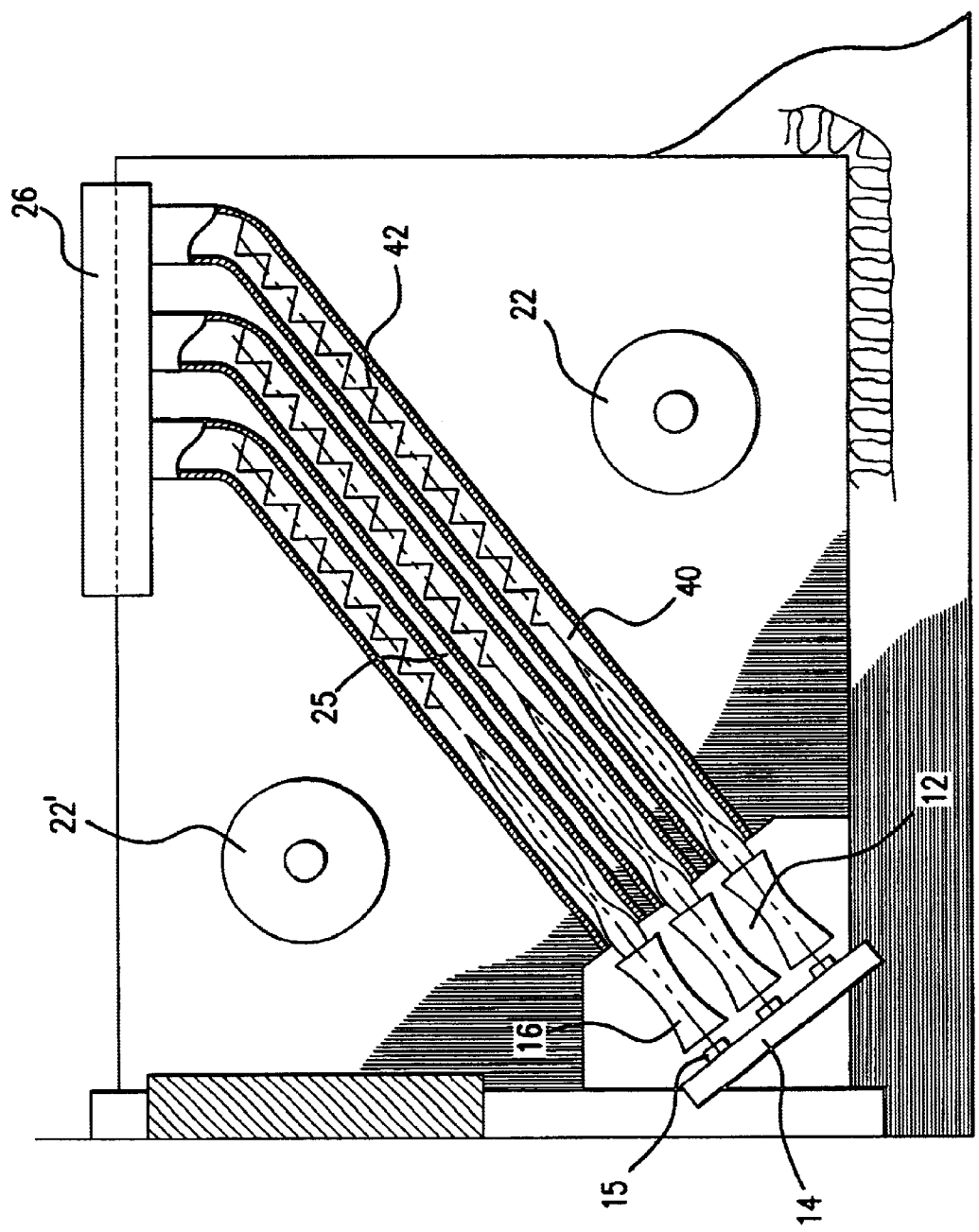
FIG. 2 is a schematic side view of a convection oven showing two blower wheels mounted adjacent a plurality of heat exchange tubes, according to one preferred embodiment of this invention.
Figure 3:
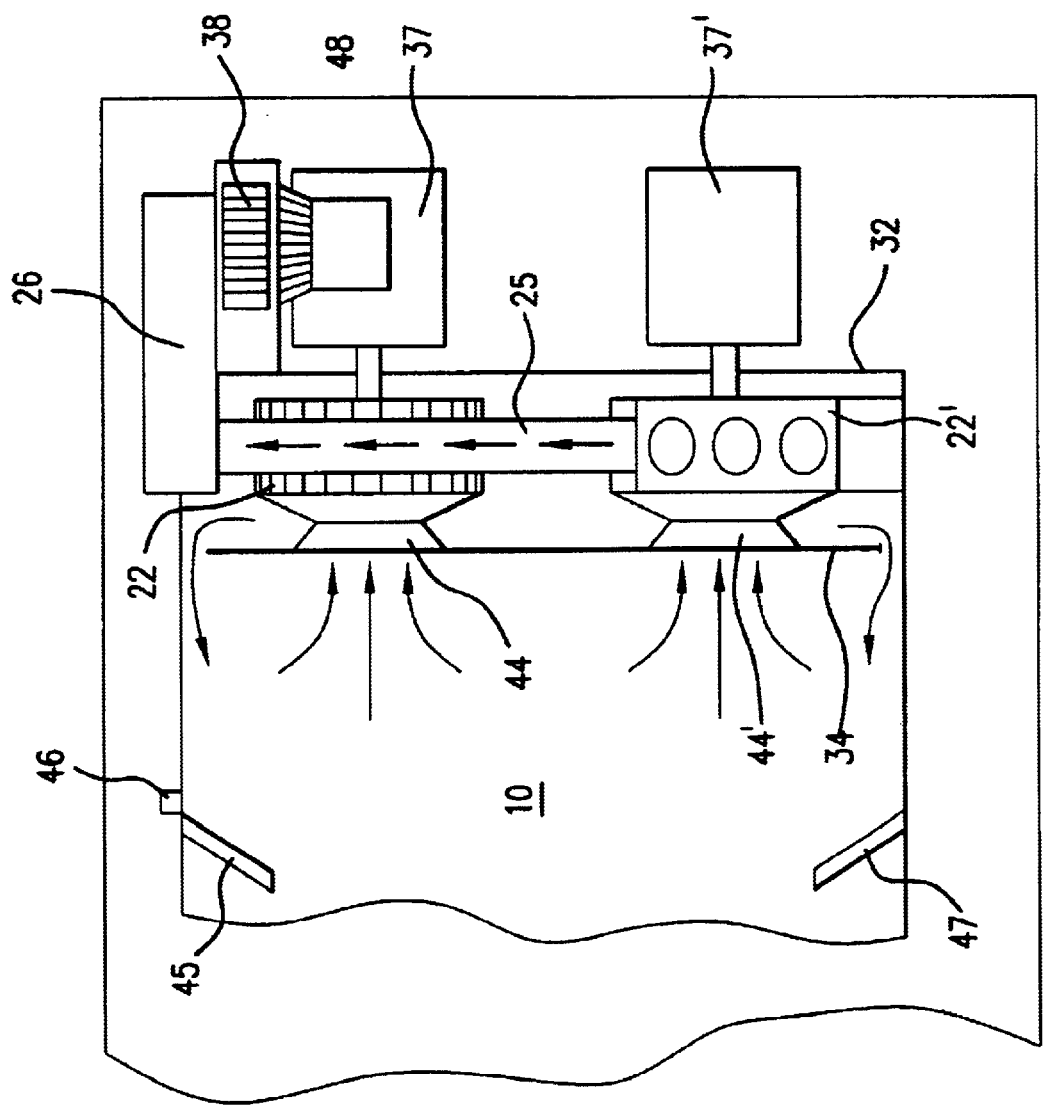
FIG. 3 is a partial schematic front view of a convection oven showing the communication between the outer enclosure and the inlet baffle, according to one preferred embodiment of this invention.

Convection oven 5, as shown in FIGS. 1–3, preferably, but not necessarily, is a commercial convection oven having a combustion system switchable between a direct-fired combustion system and an indirect-combustion system. Convection oven 5 comprises a cooking chamber 10. Preferably, cooking chamber 10 has at least one rack for supporting a food product during the baking cycle. Cooking chamber 10 can have dimensions to accommodate any type, quantity and/or size of food product.

As shown in FIG. 1, an outer enclosure 32 is positioned adjacent and in communication with cooking chamber 10. A first reversible blower wheel 22 is mounted within outer enclosure 32. In one preferred embodiment of this invention, first reversible blower wheel 22 has a diameter of about 7 inches. First reversible blower wheel 22 is driven by a reversible motor 37. In one preferred embodiment of this invention, reversible motor 37 has about 0.50 horsepower ("hp"). It is apparent to those skilled in the art that other means may be used to drive first reversible blower wheel 22 to produce the required airflow of this invention.

In another preferred embodiment of this invention, a second reversible blower wheel 22', preferably, but not necessarily, the same or similar to first reversible blower wheel 22, is mounted within outer enclosure 32. Second reversible blower wheel 22' can be driven by reversible motor 37 or can be driven by a second reversible motor 37'. In such embodiments wherein first reversible blower wheel 22 and second reversible blower wheel 22' are driven by reversible motor 37, any belt and/or gear arrangement known to those of ordinary skill in the art may be used to allow first reversible blower wheel 22 and second reversible blower wheel 22' to rotate at different speeds and/or in different directions with respect to each other.

First reversible blower wheel 22 and second reversible blower wheel 22' rotate in the same direction with respect to each other or in different or opposite directions with respect to each other, producing at least four separate airflow states that create different airflow patterns within cooking chamber 10.

The separate airflow states include: (a) first reversible blower wheel 22 rotating in a clockwise direction and second reversible blower wheel 22' rotating in a clockwise direction; (b) first reversible blower wheel 22 rotating in a clockwise direction and second reversible blower wheel 22' rotating in a counterclockwise direction; (c) first reversible blower wheel 22 rotating in a counterclockwise direction and second reversible blower wheel 22' rotating in a counterclockwise direction; and (d) first reversible blower wheel 22 rotating in a counterclockwise direction and second reversible blower wheel 22' rotating in a clockwise direction. Additional airflow patterns are created by varying the speed at which first reversible blower wheel 22 and/or second reversible blower wheel 22' rotate with respect to each other.

Preferably, but not necessarily, the airflow states produce a uniform airflow pattern within cooking chamber 10. A uniform baking performance is obtained by averaging the multiple airflow patterns created by periodically switching between airflow states during the baking cycle. The baking performance of the average state is better than the baking performance of any individual airflow state.

In another preferred embodiment of this invention, at least one adjustable airflow control surface 45 is mounted within cooking chamber 10, as shown in FIGS. 1 and 3. Adjustable airflow control surface 45 comprises, for example a baffle or a fin which is adjustable between a plurality of positions to change the geometry of cooking chamber 10. An actuator 46 adjusts adjustable airflow control surface 45 between a plurality of positions during the baking cycle of convection oven 5. By adjusting adjustable airflow control surface 45, multiple airflow patterns are created within cooking chamber 10. Adjustable airflow control surface 45 can be actuated mechanically, electrically or by other actuating means known to those skilled in the art. Further, adjustable airflow control surface 45 can be adjusted to various positions periodically during the cooking cycle in a predetermined sequence of positions or in a random sequence of positions.

In one preferred embodiment of this invention, a removable inlet baffle 34 is positionable between cooking chamber 10 and outer enclosure 32, as shown in FIGS. 1 and 3. Preferably, inlet baffle 34 has a first air return 44, in communication with first reversible blower wheel 22, and a second air return 44', in communication with second reversible blower wheel 22', to allow communication between cooking chamber 10 and outer enclosure 32, as shown in FIG. 3. In another preferred embodiment of this invention, inlet baffle 34 has a plurality of apertures to allow communication between cooking chamber 10 and outer enclosure 32.

Convection oven 5 further comprises a gas combustion system 12 mounted with respect to outer enclosure 32, as shown in FIGS. 1 and 2. Gas combustion system 12 produces or generates combustion products. The term "combustion products" as used throughout this specification and in the claims includes, but is not limited to, heat and combustion gas fumes, for example carbon monoxide and nitric acid.

Gas combustion system 12 comprises a gas manifold 14 having at least one gas outlet 15, preferably at least three gas outlets 15. A gas supply 13 supplies gas, for example natural gas, to gas manifold 14. As shown in FIGS. 1 and 2, a burner is attached to each gas outlet 15. As gas is distributed through gas outlets 15 and into burners 16, the gas burns or combusts to generate combustion products. The combustion products move into a heat exchange element 25 connected to each burner 16. Heat exchange element 25 is mounted within outer enclosure 32 and with respect to first reversible blower wheel 22 and/or second reversible blower wheel 22'. Preferably, heat exchange element 25 is mounted adjacent first reversible blower wheel 22 and second reversible blower wheel 22' within outer enclosure 32.

In one preferred embodiment of this invention, heat exchange element 25 comprises a plurality of heat exchange tubes 40, as shown in FIGS. 1 and 2. Preferably, each heat exchange tube 40 has an outer diameter of about 2.0 inches. A baffle 42 is positioned within at least a portion of a volume of each heat exchange tube 40 to assist in conductive and convective heat exchange. At least one heat exchange tube 40 is preferably connected to each burner 16 of gas combustion system 12. As the combustion products move through each heat exchange tube 40, heat is transferred from within heat exchange tube 40 to a volume of outer enclosure 32 by conduction through heat exchange tube 40. Further, first reversible blower wheel 22 and/or second reversible blower wheel 22' produces an airflow across heat exchange tubes 40 to transfer heat from heat exchange tubes 40 to the airflow through convection.

As shown in FIGS. 1 and 3, heat exchange tubes 40 are connected to a header 26. Header 26 is mounted within outer enclosure 32 and in communication with gas combustion system 12. The combustion products are collected from each heat exchange tube 40 in a volume of header 26 and are drawn into an inducer 38 connected to header 26.

A valve 48, shown in FIG. 3, positioned within inducer 38, is moveable between an open position and a closed position. In the open position, the combustion products drawn into inducer 38 are in communication with the ambient air through a vent connected to inducer 38. Thus, the combustion products do not enter cooking chamber 10 and convection oven 5 operates as an indirect-fired combustion system.

In the closed position, the combustion products drawn into inducer 38 are in communication with cooking chamber 10. Thus, convection oven 5 operates as a direct-fired combustion system. In a direct-fired combustion system, the combustion products directly contact the food product in cooking chamber 10 during the cooking process.

Referring to FIGS. 1–3, first reversible blower wheel 22 and second reversible blower wheel 22' generate an airflow across heat exchange element 25 within outer enclosure 32. Heat is transferred from heat exchange element 25 to the air flowing through outer enclosure 32 by conduction and convection. The heated air is forced around inlet baffle 34 and into cooking chamber 10. Air within cooking chamber 10 is drawn into outer enclosure 32 through first air return 44 in communication with first reversible blower wheel 22 and second air return 44' in communication with second reversible blower wheel 22', creating an airflow pattern within cooking chamber 10.

In one preferred embodiment according to this invention, separate airflow states are produced by varying the speed at which first reversible blower wheel 22 and/or second reversible blower wheel 22' rotate with respect to each other and/or by changing the direction in which first reversible blower wheel 22 and/or second reversible blower wheel 22' rotate. By varying the respective speed and/or rotational direction of blower wheels 22 and 22' to produce separate airflow states, multiple airflow patterns are created within cooking chamber 10. These airflow patterns are switched or changed periodically during the baking cycle to improve the baking performance of convection oven 5. Periodically switching between separate airflow states can be accomplished mechanically, electrically or by other means known to those having ordinary skill in the art. Further, periodic switching between separate airflow states can occur in a predetermined or a random manner.

In another preferred embodiment according to this invention, adjustable airflow control surface 45 produces an airflow pattern within cooking chamber 10 by changing the geometry of cooking chamber 10. Actuator 46 adjusts adjustable airflow control surface 45 between a plurality of positions during the baking cycle to create multiple airflow patterns within cooking chamber 10. A second adjustable airflow control surface 47 within cooking chamber 10 is adjustable by actuator 46 in combination with or independent from adjustable airflow control surface 45 during the baking cycle. The multiple airflow patterns created during the baking cycle improve the baking performance of convection oven 5. Further, adjustable airflow control surface 45 can be used in combination with first reversible blower 22 and second reversible blower 22' during the baking cycle of convection oven 5 to create multiple airflow patterns within cooking chamber 10.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed:

1. A convection oven comprising:

a cooking chamber;

a blower plenum in communication with the cooking chamber;

heating means for heating said cooking chamber disposed within said blower plenum, said heating means comprising switching means for switching between direct and indirect heating of said cooking chamber;

an adjustable airflow control surface disposed within the cooking chamber;

an actuator suitable for adjusting the adjustable airflow control surface operably connected to the adjustable airflow control surface; and a first reversible blower wheel mounted within the blower plenum, the first reversible blower wheel creating multiple airflow patterns during a baking cycle.

2. The convection oven of claim 1 further comprising a second reversible blower wheel mounted within the blower plenum.

3. The convection oven of claim 2 wherein the first reversible blower wheel rotates at a speed different from a speed at which the second reversible blower wheel rotates.

4. The convection oven of claim 2 wherein the first reversible blower wheel rotates in a direction different from a direction in which the second reversible blower wheel rotates.

5. The convection oven of claim 1, wherein said heating means comprises a gas combustion system mounted with respect to the blower plenum, the gas combustion system generating combustion products, a heat exchange element mounted within the blower plenum and connected to the gas combustion system, a header connected to the heat exchange element, the header in communication with the gas combustion system, and an inducer connected to the header, the inducer having a valve moveable between an open position and a closed position, whereby said combustion products are one of conveyed into said cooking chamber and exhausted from said convection oven.

6. The convection oven of claim 5 wherein the first reversible blower wheel and a second reversible blower wheel are mounted adjacent the heat exchange element.

7. The convection oven of claim 5 wherein the heat exchange element comprises a plurality of heat exchange tubes, each heat exchange tube of the plurality of heat exchange tubes having a baffle within at least a portion of a volume of the heat exchange tube.

* * * * *